United States Patent [19]
Verdier

[11] 3,934,634
[45] Jan. 27, 1976

[54] RADIAL TIRE WITH AUXILIARY CARCASS PLIES

[75] Inventor: Henri Verdier, Beauregard-l'Eveque, France

[73] Assignee: Compagnie Generale des Etablissements Michelin, raison sociale Michelin & Cie, Clermont-Ferrand (Pay-de-Dome), France

[22] Filed: Feb. 22, 1974

[21] Appl. No.: 444,751

[30] Foreign Application Priority Data
Mar. 2, 1973 France .......................... 73-08026

[52] U.S. Cl. .............................. 152/354; 152/361 R
[51] Int. Cl.² .......................... B60C 5/08; B60C 9/10
[58] Field of Search ........... 152/354, 355, 356, 357, 152/358, 359, 361 R, 374

[56] References Cited
UNITED STATES PATENTS

| | | | |
|---|---|---|---|
| 3,414,447 | 12/1968 | Travers | 152/356 |
| 3,550,666 | 12/1970 | Menell | 152/361 R |
| 3,735,790 | 5/1973 | Bertrand | 152/361 R |

Primary Examiner—Drayton E. Hoffman
Assistant Examiner—Larry H. Martin
Attorney, Agent, or Firm—Brumbaugh, Graves, Donohue & Raymond

[57] ABSTRACT

The tread reinforcement of a pneumatic tire comprises at least two plies of cords that are crossed with respect to each other and oblique with respect to the longitudinal direction. The carcass reinforcement comprises at least one principal ply extending from one bead to the other and two auxiliary plies having cords oblique with respect to the longitudinal direction and arranged one on one side and the other on the other side of the median plane of the tire. The cords of the principal ply are oblique with respect to the radial direction in the zones in which the auxiliary plies are mounted and radial in other zones.

8 Claims, 4 Drawing Figures

RADIAL TIRE WITH AUXILIARY CARCASS PLIES

BACKGROUND OF THE INVENTION

This invention relates to pneumatic tires and, more particularly, to pneumatic tires of the radial type the carcass reinforcement of which has additional plies.

A so-called radial tire has a tread reinforcement comprising at least two crossed plies of cords, preferably of metal, which are oblique with respect to the longitudinal direction of the tire. Such a tire also has a carcass reinforcement comprising at least one ply of substantially radial cords or cables that are continuous from one bead wire to the other.

Tires of this type have the reputation of providing a comfortable ride due to the flexibility of their carcass reinforcement. However, precisely because of the great flexibility of the carcass reinforcement, the stiffness of the tread reinforcement is not sufficient to obtain the best highway behavior under all circumstances.

For this reason it has been attempted to correct the drawbacks resulting from the flexibility of the carcass reinforcement. However, the means of correction employed heretofore have decreased the comfort of the ride.

For example, oblique auxiliary plies, that is to say plies independent of the carcass ply proper and of a width less than one-half the width of the carcass reinforcement, measured from bead wire to bead wire, have been added to the carcass reinforcement. The corrective action of the auxiliary plies depends to a great extent on their width. As this width reduces the width of the zones in which the carcass reinforcement has substantially radial cords, the auxiliary plies necessarily reduce the comfort of the ride.

SUMMARY OF THE INVENTION

An object of the invention is to remedy the problems outlined above and, in particular, to benefit from the corrective effects of auxiliary plies without a resulting reduction in the comfort of the ride.

The foregoing and other objects are attained by directing the cords of the main or principal carcass ply, defined as a carcass ply extending from one bead wire to the other, along oblique paths in the vicinity of the auxiliary plies.

More particularly, a tire in accordance with the present invention is provided with a tread reinforcement having at least two crossed plies of cords or cables slightly inclined with respect to the longitudinal direction and with a carcass reinforcement having at least one principal ply and, in two zones located one on one side and the other on the other side of the median or equatorial plane of the tire, an auxiliary ply with cords or cables that are oblique with respect to the longitudinal direction. The tire is characterized in that, outside the zones of the auxiliary plies, the principal carcass ply or plies have cords or cables oriented substantially radially, while in the zones in which the auxiliary plies are located, these cords or cables are oblique with respect to the longitudinal direction.

The invention provides improved riding comfort. The two bends in each half of the carcass formed by the cords or cables of the principal carcass ply, and the oblique segment of the cords or cables contained between these two bends, modify the paths of the disturbances that come from the tread during rolling of the tire. This modification of path prevents the cords or cables of the principal carcass ply from being attacked axially by the disturbances. It also provides zones in which the oblique cords of the auxiliary plies cooperate better with the principal ply, because the diamond meshes formed by the cords or cables of the principal carcass ply and those of the auxiliary plies are more flexible, having not just two but four sides inclined with respect to the radial direction. As already indicated, the improved comfort is related to the use, jointly with the auxiliary plies, of at least one principal ply continuous from bead wire to bead wire. Such a structure has the advantage, aside from its simplicity as compared with a principal ply composed of a multiplicity of parts or plies, that it avoids in the sidewalls multiple reflections of the disturbances coming from the crown of the tire. These parasitic reflections are under certain conditions responsible for an increase in passenger discomfort. The arrangement in accordance with the invention excludes them outright.

The preferred inclination of the oblique portions of the cords of the principal carcass ply or plies with respect to the radial direction is more than 10° and between 10° and 60°. Within this range, the more the cords of the principal ply or plies are inclined with respect to the radial direction in the zones in which the auxiliary plies are located the more noticeable the improvement in comfort is. There is not only an attenuation of oscillations but an improvement in stability on rough road surfaces, which further promotes passenger comfort.

Moreover, a vehicle equipped with tires in accordance with the invention exhibits satisfactory road behavior with respect to cornering, precision of steering, and gradualness of maneuvers.

In a preferred embodiment of the invention, the cords of the principal carcass ply or plies are substantially radial near each bead over a length equal at least to 1/8 of the width of the principal carcass ply and below the tread reinforcement over a length also equal at least to 1/8 of the width of the principal ply. The width of the principal ply, referred to below as 2 S, is measured from one bead wire to the other. The principal carcass ply thus has at least three radial zones: two zones each adjacent to one of the beads and each extending over at least 1/8 of the width of the carcass reinforcement and one zone below the tread reinforcement and extending over at least 1/8 of the width of the carcass reinforcement. It is preferable to arrange the auxiliary plies near the portion of the tire through which the disturbances are introduced: that is, near the crown of the tire rather than near the beads. If mounted near the beads, they would interfere with the portions of the principal carcass ply folded around the bead wires.

In another preferred embodiment of the invention, the auxiliary plies have widths of between 1/5 and 3/5 of the arithmetic average of the widths of the tread plies. An auxiliary-ply width of less than 1/5 of the average tread-ply width leads to an excessive reduction in the zones of the principal carcass ply having oblique cords or cables. An auxiliary-ply width of more than 3/5 of the average tread-ply width results, on the other hand, in excessive stiffening.

The preferred inclination of the cords of the auxiliary plies with respect to the longitudinal direction is between 6° and 60°. On the one hand, the stiffening effect decreases when the inclination increases. On the other hand, the selection of the angle has an effect on the building of the tire, as explained below.

The selection of the angles made by the cords of the auxiliary plies with the longitudinal direction and with the cords of the first tread ply, that is to say the tread ply closest to the carcass reinforcement, is also within the invention.

Thus one can employ auxiliary plies of which the cords are oriented in the same direction or of which the cords of one auxiliary ply on the one hand and those of the other auxiliary ply on the other hand are symmetrical with respect to the longitudinal direction of the tire. In the former case, the orientation of the cords of the auxiliary plies may be in the same direction as that of the cords of the first tread ply, or the cords of the auxiliary and first tread plies may be symmetrical with respect to the longitudinal direction of the tire. If the cords of one auxiliary ply on the one hand and those of the other auxiliary ply on the other hand are symmetrical with respect to the longitudinal direction of the tire, the orientation of the cords of one auxiliary ply is the same as that of the cords of the first tread ply, and that of the cords of the other auxiliary ply is symmetrical as referred to the longitudinal direction.

The structure of the carcass reinforcement in accordance with the invention can be obtained in various ways.

A first comprises building the carcass reinforcement with a principal ply having preformed non-radial zones and then placing the auxiliary plies on these preformed zones.

Another comprises arranging on a cylindrical building drum a completely radial principal ply and the auxiliary plies to form a cylindrical blank and then shaping the blank into final toroidal form, allowing the beads and the sidewalls of the tire to move around the building drum if necessary.

An advantage of this method is that in the zones of the auxiliary plies the reaction of the latter on the principal carcass ply makes the cords of the principal ply oblique. One feature of this process is that during the shaping of the blank the pitch of the cords of the auxiliary plies decreases. This leads to an extruding of the connecting rubber between the cords of the auxiliary plies and to the formation of an additional thickness of rubber on the surface of these plies.

BRIEF DESCRIPTION OF THE DRAWING

A better understanding of the invention can be gained from a consideration of the following detailed description of the preferred embodiments thereof in conjunction with the appended figures of the drawing, wherein.

DESCRIPTION OF THE PREFERRED EMBODIMENTS

Figure 1:
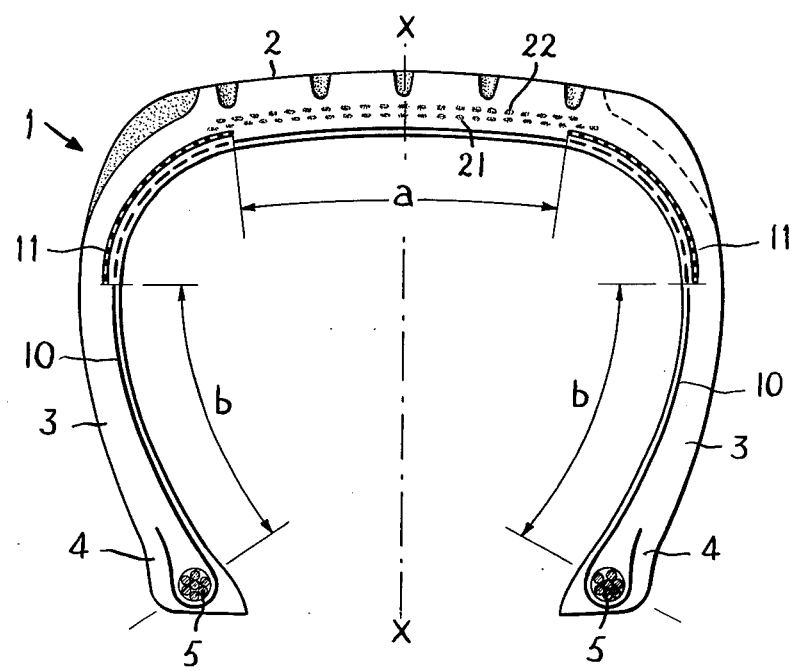
FIG. 1 shows a cross section along a radial plane of a tire in accordance with the invention.
Figure 2:
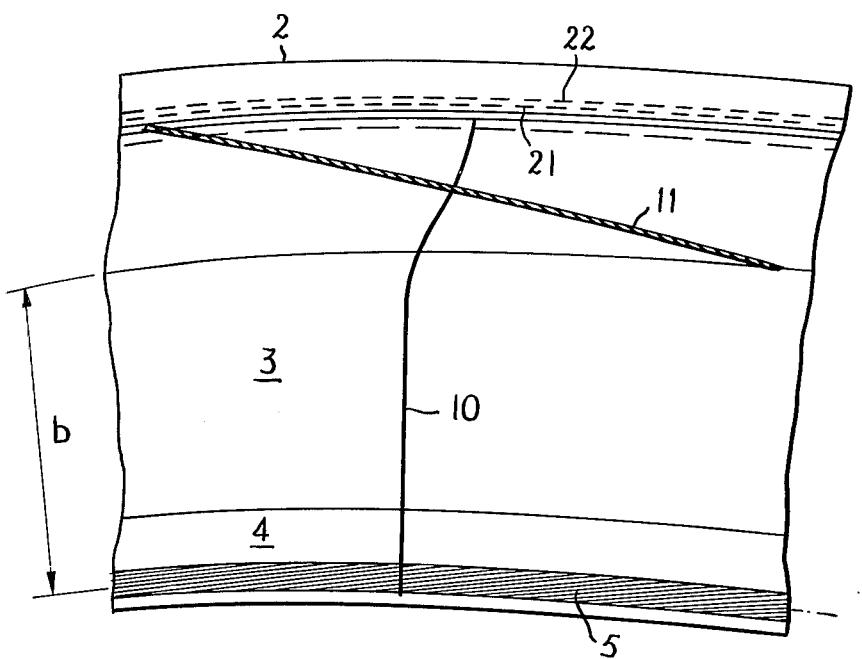
FIG. 2 shows a section of the tire of FIG. 1 from the outside in an axial direction.

The tire 1 shown in FIGS. 1 and 2 comprises a tread 2 extended laterally by sidewalls 3 terminating in beads 4 in each of which a bead wire 5 is arranged.

The reinforcement of the tire comprises a carcass reinforcement and a tread reinforcement. The carcass reinforcement comprises a principal ply 10 and auxiliary plies 11 lying partly under the tread reinforcement and extending beyond the tread reinforcement at least into the shoulder area, and the tread reinforcement comprises two plies 21 and 22 of oblique cords. The principal ply 10 extends continuously from one bead 4 to the other and is anchored around the bead wires 5.

This principal ply 10 has three zones in which the cords or cables are radial: a central zone of width a extending on both sides of the median plane X—X and two lateral zones, each extending over a width b from the bead wires 5 into the sidewalls 3.

The principal ply 10 furthermore comprises on opposite sides of the median plane X—X two zones on which the auxiliary plies 11 are arranged. In these two zones the cords or cables of the principal ply 10 are oblique and intersect the cords or cables of the auxiliary plies 11. By length a or b there is understood, of course, the developed length of the arc in the radial section represented by the zones in question. Thus if 2 S represents the developed length of the arc of the principal ply extending from one bead wire 5 to the other, i.e., the width of the principal carcass ply 10, the length of each of the two zones of the principal ply 10 in which the cords or cables are oblique is equal to S - ($a/2 + b$). This length is approximately equal to the width of each of the auxiliary plies 11.

In FIG. 2, only one cord of the principal carcass ply 10 and of an auxiliary carcass ply 11 has been shown, for purposes of simplicity. In the zone b the carcass cord 10 is oriented radially from the bead wire 5 around which it is turned up, but beyond this zone it is oblique, crosses the cord of the ply 11 and then becomes radial again. The two superposed tread plies 21 and 22 are also shown in this figure.

Figure 3:
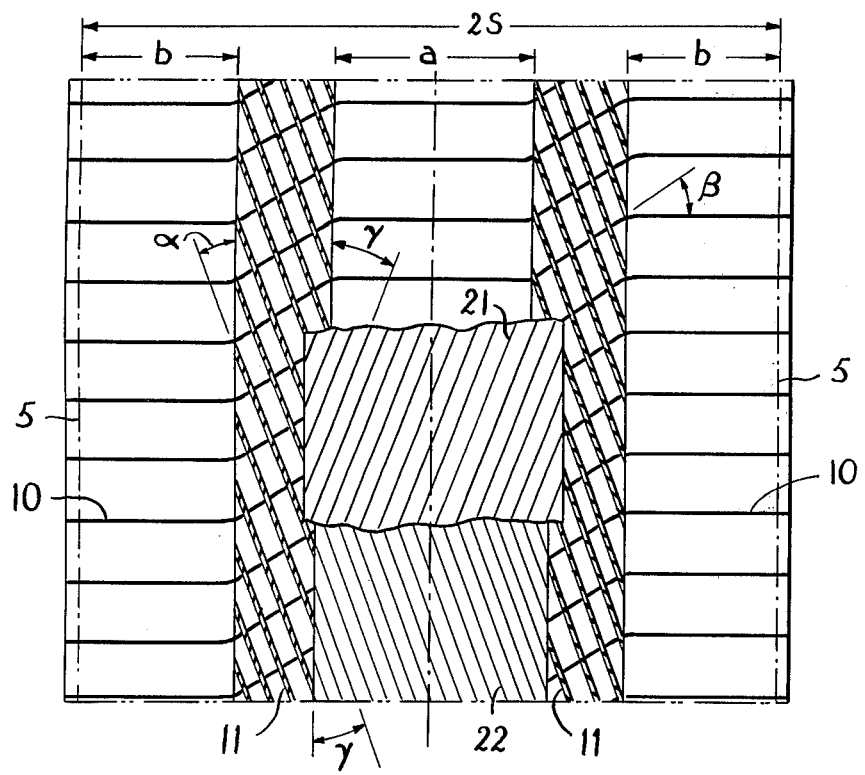
FIGS. 3 and 4 are developed plan views of a tire of size 175-14 in accordance with the invention, showing two arrangements of carcass plies and tread plies within the scope of the invention.

FIG. 3 shows diagrammatically the arrangement of the cords in a preferred embodiment of the invention. The cords are shown flat with a greatly exaggerated distance between them for greater ease in reading the drawing. In this arrangement, the polyamide cords of the two auxiliary plies 11 are inclined to the left with respect to the longitudinal axis X—X with which they form an angle $\alpha$ of 22°. Each ply 11 has a width of 50 mm. The principal carcass ply 10 comprises cords of rayon oriented radially, that is to say in planes passing through the axis of the tire in the zones a and b; under the auxiliary carcass plies 11, these cords are inclined to the right with respect to the longitudinal axis X—X, and they form an angle $\beta$ of 30° with the radial direction in zones a and b.

The zone a has a width of 105 mm, and each of the zones b a width of 80 mm. The length 2 S measured from bead wire to bead wire is 365 mm.

The two tread plies 21 and 22 are reinforced with metal cords or cables inclined to the right and left respectively with respect to the longitudinal axis X—X, with which they form an angle $\gamma$ of 21°. The ply 21 has a width of 126 mm, and the ply 22 a width of 114 mm.

Figure 4:
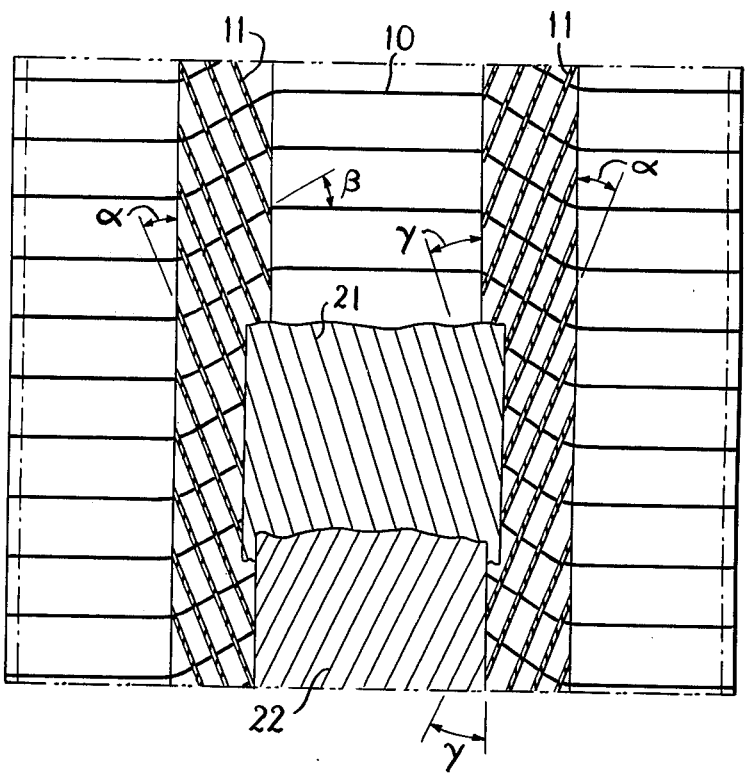

FIG. 4 shows diagrammatically, in the same manner as FIG. 3, another preferred embodiment of the invention. The cords or cables are of polyamide, rayon, metal, or other suitable materials, and the widths of the plies are unchanged. As compared with the embodiment of FIG. 3, the embodiment of FIG. 4 differs mainly in that one of the auxiliary carcass plies comprises cords oriented to the left with respect to the longitudinal axis X—X while the other has its cords oriented to the right with respect to that axis. It follows that between the zones *a* and *b* the cords of the principal carcass ply 10 are inclined to the right with respect to the longitudinal axis X—X where the cords of the auxiliary ply 11 are directed to the left, and vice versa.

Another difference from the embodiment of FIG. 3 is the reversal of the direction of inclination of the metal cords or cables of the tread plies 21 and 22.

In order to show the improvement obtained by increasing the obliqueness of the cords or cables of the principal carcass ply, two tires of size 175-14 were compared. They had identical reinforcement except that in the first tire the cords of the principal ply formed an angle $\beta$ of 15° with respect to the radial direction while in the second this angle was 30°. By thus doubling the angle in the zones in question the gain in comfort, precision of steering, cornering, and gradualness of maneuvers were noticeable and substantial.

Many other embodiments of the invention will occur to those skilled in the art upon consideration of this disclosure. Accordingly, the invention is not limited except by the following claims.

I claim:

1. A pneumatic tire comprising a tread, a pair of beads, a carcass reinforcement and a tread reinforcement, the tread reinforcement having a width substantially equal to the width of the tread and comprising at least two plies of cords that are crossed with respect to each other and oblique with respect to the longitudinal direction of the tire and the carcass reinforcement comprising at least one principal ply extending from one bead to the other and two auxiliary plies having cords oblique with respect to the longitudinal direction and arranged one on one side and the other on the other side of the median plane of the tire, the cords of the principal ply being, in the zones in which the auxiliary plies are mounted, oblique with respect to the radial direction of the tire and, in three zones, radial, two of the zones of the principal ply in which the cords of the principal ply are radial being respectively near the two beads and each extending over at least ⅛ of the width of the principal ply, the third of the zones of the principal ply in which the cords of the principal ply are radial also extending over at least ⅛ of the width of the principal ply, said zones in which the auxiliary plies are mounted lying partly under said tread reinforcement and said zones extending beyond said tread reinforcement at least into the shoulder area, and the entirety of said third of the zones of the principal ply lying under said tread reinforcement.

2. A pneumatic tire according to claim 1 wherein each auxiliary ply has a width between 1/5 and 3/5 of the average width of the tread plies.

3. A pneumatic tire according to claim 1 wherein the cords of each auxiliary ply have inclinations of between 6° and 60° with respect to the longitudinal direction.

4. The pneumatic tire according to claim 1 wherein the cords of the two auxiliary plies have inclinations of the same sign as referred to the median plane.

5. The pneumatic tire according to claim 1 wherein the cords of the two auxiliary plies have inclinations of opposite sign as referred to the median plane.

6. A pneumatic tire according to claim 1 wherein the cords of the two auxiliary plies and of the tread ply closest to the carcass reinforcement have inclinations of the same sign as referred to the median plane.

7. A pneumatic tire according to claim 1 wherein the cords of one of the auxiliary plies and of the tread ply closest to the carcass reinforcement have inclinations of the same sign, and the cords of the other auxiliary ply have inclinations of the opposite sign, as referred to the median plane.

8. A pneumatic tire according to claim 1 wherein the cords of the principal ply have an inclination of between 10° and 60° with respect to the radial direction in the zones in which the auxiliary plies are mounted.

* * * * *